UNITED STATES PATENT OFFICE.

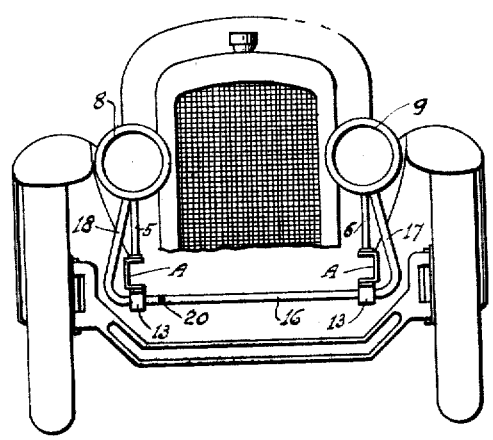
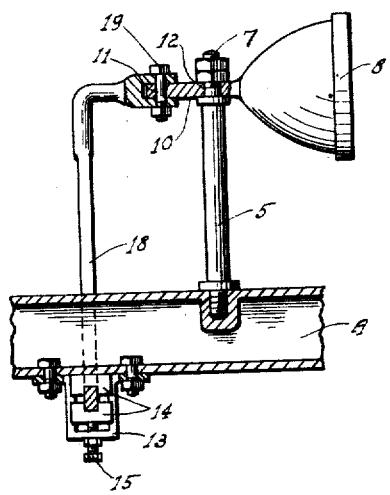
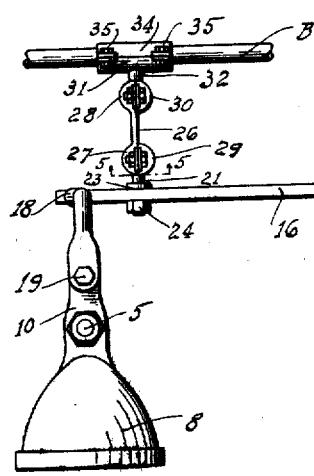
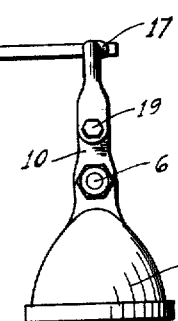
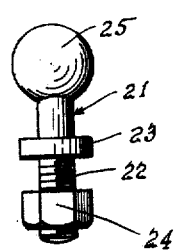
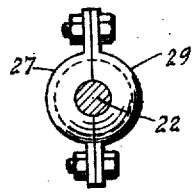
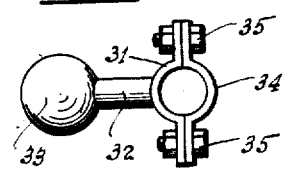

WILLIS WILLARD DART, OF OGLESBY, OKLAHOMA.

DIRIGIBLE HEADLIGHT.

1,425,751.  Specification of Letters Patent.  Patented Aug. 15, 1922.

Application filed October 1, 1921. Serial No. 504,668.

*To all whom it may concern:*

Be it known that I, WILLIS WILLARD DART, a citizen of the United States, residing at Oglesby, in the county of Washington and State of Oklahoma, have invented certain new and useful Improvements in Dirigible Headlights, of which the following is a specification, reference being had to the accompanying drawings.

This invention relates to dirigible headlights and has for its object to provide a mechanism of this character wherein the lights are directed in accordance with the movement of the front wheels of the vehicle.

It is also an object of the invention to provide a mechanism of this character capable of being applied to the steering post of an automobile without requiring alteration of the steering mechanism.

It is a still further object of the invention to provide a mechanism of this character wherein each headlight is operated by the same mechanism so that the position of each headlight after adjustment thereof is the same.

With these and other objects in view the invention consists in the improved construction and arrangement of parts to be hereinafter more particularly described, fully claimed and illustrated in the accompanying drawings, in which:—

Figure 1 is a front elevation of an automobile, a portion of the radiator being broken away to show the invention applied;

Figure 2 is a top plan view of the invention assembled and connected to the connecting rod;

Figure 3 is a side elevation and sectional view of the headlight mounting showing the connection of the actuating means to the headlight;

Figure 4 is a detailed and sectional view of the means for connecting the operating mechanism to the connecting rod;

Figure 5 is a section taken on the line 5—5 of Figure 2; and

Figure 6 is a detailed view of the coupling means carried by the actuating member.

Referring to the drawings, A designates the chassis of an automobile and B the connecting rod of the steering mechanism which is operatively connected in the well known manner to the front wheels of the automobile.

In order to permit the light rays of the headlights to be projected into the path of the wheels, for instance, when turning a corner, there is provided a novel mechanism for simultaneously shifting the headlights with the wheels, said mechanism being operable upon turning of the steering wheel, said mechanism embodying headlight standards 5 and 6 which are connected at one of their ends to the chassis of an automobile, the opposite end of each standard being provided with a collar, reduced and threaded as at 7. Headlights 8 and 9 are adapted to be supported by the standards 5, each headlight including an arm 10 having an opening 11 in its end and an opening 12 adjacent the rear portion of the headlight. The reduced end portions 7 of the standards 5 are adapted to extend through the openings 12 of the arms 10 to pivotally support the headlight.

Secured to both sides of the chassis A adjacent each of the headlights is a bracket 13 on which a pair of bearing blocks 14 are disposed, each block having a recess formed therein, the purpose of which will be hereinafter described. A set screw 15 extends through the lower portion of the bracket for urging said blocks toward the chassis. Extending transversely of the chassis and mounted in the bearing blocks 14 is an actuating member 16, said member being substantially U-shaped and having its arms 17 and 18 inclining inwardly toward the standards 5 and 6. The end portions of the arms 17 and 18 are extended at right angles to said arms, enlarged and bifurcated for the reception of the end portions of the arms 10 of the headlights, fastening means 19 being passed through the end portions of the arms 17 and 18 and the arms 10 to pivotally connect the actuating member to the headlights. It is of course obvious that the actuating member is slidable in the bearing block 14 so that any movement of the steering mechanism will be imparted to the headlights.

To connect the actuating member to the steering mechanism, for instance, the connecting rod, that portion of the actuating member extending transversely of the chassis, is provided adjacent one end thereof with an opening 20 through which a coupling member 21 is passed, said member including a shank 22 having a collar 23 adapted to engage the inner surface of the actuating member 16, while a nut 24 is threaded on the end of the shank to rigidly connect the same to the actuating member, the opposite end of the shank being provided with a ball 25. A connecting link 26 is adapted to engage the ball 25, said connecting link having semi-spherical socket members 27 and 28 formed on its end portions, one of said semi-spherical sockets being adapted to engage the ball 25, while a semi-spherical plate 29 is engaged with the socket 27 to clamp the connecting link to the head 25. It is of course obvious that the semi-spherical socket entirely surrounds the head 25 with the exception of the portion thereof through which the shank 22 extends. The opposite end of the connecting link 26 is likewise provided with a semi-spherical plate 30 which similar to the plate 29 is adapted to be bolted to the semi-spherical end portions of the connecting link to provide a socket.

In order to connect the mechanism just described to the connecting rod B there is provided a novel form of clamp including a curved plate or body member 31 from the exterior face of which a shank 32 projects, the shank being formed integral with the plate, while projecting from the end of the shank is a ball 33. A curved plate 34 is provided, said plate cooperating with the plate 31 to form a sleeve through which the connecting rod B extends, bolts 35 being employed for firmly clamping the plates 31 and 34, to the connecting rod. The head 33 or coupling member is adapted to be disposed within the semi-spherical socket formed by the portion 28 of the connecting link 26 and plate 30. With this novel arrangement, when the steering mechanism is operated to shift the front wheels, corresponding movement is imparted to the actuating member 16 in view of the novel means connecting the actuating member to the connecting rod so that the light rays are directed into the path of the front wheels regardless of the angle at which the wheels may be positioned.

From the foregoing it will be readily seen that this invention provides a novel dirigible headlight mechanism which in view of its simplicity may be readily applied to any make of automobile and as it does not depend on structure independent of the steering mechanism to operate the same there is no danger of the headlights not responding or turning with the front wheels. Furthermore, this mechanism is neat in appearance as the greater portion or main portion of it is disposed beneath the chassis so that it is practically invisible.

What is claimed is:—

1. A dirigible headlight mechanism embodying a pair of headlights, each headlight having an arm projecting from the rear portion thereof, said arm being pivotally mounted substantially at its central portion on a support for movement in a horizontal plane, the end of said arm being provided with an opening, a substantially U-shaped actuating member mounted on the chassis of an automobile, the ends of said member being bifurcated, fastening means extending through said bifurcations and the openings in the ends of said arms, and means for connecting the actuating member to the steering mechanism of the automobile.

2. A dirigible headlight mechanism embodying a pair of spaced standards carried by the chassis of an automobile, a pair of headlights, each headlight having an arm formed integral therewith and projecting from the rear wall of said headlight, each arm having a central opening adapted to receive the end of one of the standards for oscillating movement upon the standards, and an actuating member consisting of a bar bent substantially U-shaped to provide arms, said arms extending from the chassis to the headlights substantially parallel to the standards, the extremities of said arms being extended outwardly in parallel relation to each other and at right angles to the arms, and pivoted to the ends of the arms of the headlights.

In testimony whereof I hereunto affix my signature.

WILLIS WILLARD DART.